United States Patent [19]

Takemura et al.

[11] 3,851,692

[45] Dec. 3, 1974

[54] PNEUMATIC TIRES

[75] Inventors: Satoshi Takemura; Katsuyuki Harakon; Mitsuaki Maeda; Noboru Sakai; Etsuko Hamano, all of Tokyo, Japan

[73] Assignee: Bridgestone Tire Company Limited, Tokyo, Japan

[22] Filed: Dec. 21, 1973

[21] Appl. No.: 427,169

[30] Foreign Application Priority Data

Dec. 29, 1972 Japan.................................. 48-3221

[52] U.S. Cl........... 152/361 R, 152/330 R, 152/357
[51] Int. Cl.............................................. B60c 9/22
[58] Field of Search............ 152/330 R, 357, 361 R, 152/361 DM, 359

[56] References Cited
UNITED STATES PATENTS

| | | | |
|---|---|---|---|
| 3,554,260 | 1/1971 | Shoemaker | 152/361 R |
| 3,559,714 | 2/1971 | Verdier | 152/361 DM |
| 3,627,013 | 12/1971 | Chase et al. | 152/361 R |
| 3,669,173 | 6/1972 | Young | 152/361 R |
| 3,692,080 | 9/1972 | Boileau | 152/361 DM |
| 3,717,190 | 2/1973 | Boileau | 152/361 DM |
| 3,757,843 | 9/1973 | Carr | 152/361 DM |
| 3,763,912 | 10/1973 | Bergomi et al. | 152/361 DM |

*Primary Examiner*—Drayton E. Hoffman
*Attorney, Agent, or Firm*—Sughrue, Rothwell, Mion, Zinn & Macpeak

[57] ABSTRACT

Pneumatic tires reinforced with a carcass and a breaker, said carcass being composed of polyester fiber or 6,6-nylon fiber cord layer and said breaker being composed of aromatic polyamide fiber cord layer having particularly defined tenacity, initial modulus and twisting coefficients of cable twist and ply twist and the rubber to embed the breaker having 300 percent modulus of 130 – 250 Kg/cm$^2$.

3 Claims, No Drawings

PNEUMATIC TIRES

The present invention relates to pneumatic tires and provides radial tires and bias belt tires having improved properties by using polyester fiber or 6,6-nylon fiber cord layers for the carcass and aromatic polyamide fiber cord layers for the breaker.

The pneumatic tires are classified into the following three kinds in view of the structure.

(1) Bias tires wherein the carcass cords and the breaker cords are mutually crossed obliquely against the circumferential direction of the tire.

(2) Radial tires wherein the carcass cords are substantially perpendicular to the circumferential direction of the tire and the breaker cords are substantially parallel to the circumferential direction of the tire.

(3) Bias belt tires wherein the carcass cords are mutually crossed obliquely against the circumferential direction of the tire and the breaker cords are substantially parallel to the circumferential direction of the tire.

The radial tires and the bias belt tires are similar in the structure of the breaker cords and are very superior in the high speed performance, tread wear resistance, cornering performance, ride feeling and fatigue resistance to the bias tires.

The conventional radial tires or bias belt tires use rayon fibers, 6-nylon fibers, 6,6-nylon fibers or polyester fibers as the carcass cords and steel fibers, glass fibers and extremely high modulus rayon (abbreviated as EHM rayon hereinafter) as the breaker cords.

When the rayon cords are used as the carcass cords, the rayon cords are high in the water absorption, so that the separation and tire breakage are caused early by rain water penetrated from the damage of the side portion of tire and 6-nylon fiber cords are very small in the initial modulus and therefore the cornering performance and the high speed performance are poor.

On the other hand, when the steel fiber cords are used as the breaker cords, the tread wear resistance and the cornering performance are good but the adhesion with a rubber is not sufficient and the high speed performance is poor and particularly the initial modulus of the cords is very high and consequently the ride feeling is poor and the cords are rusted by rain water penetrated from the damage in the tread portion of tires and the tire breakage occurs. When the glass fiber cords are used, the rigidity of the cord is high and therefore the impact absorption is poor and the tread portion is liable to be damaged and the fatigue resistance is inferior to the other fiber cords and when the deformation is applied locally during running, the cord is fatigued and broken and when an impact is further subjected, the tire breakage is caused. When EHM rayon cords are used, the initial modulus is lower than the glass fiber cords and steel fiber cords, so that the tread wear resistance and the high speed performance are poor and the water absorption is high and therefore the early separation and tire breakage are apt to be caused by rain water penetrated from the damage in the tread portion of tires.

The object of the present invention is to provide pneumatic radial or bias tires having improved high speed performance and fatigue resistance and having the same tread wear resistance and cornering performance as the pneumatic tires in which steel fiber cords are used for the breaker and having the same ride feeling as the pneumatic tires in which EHM rayon cords are used for the breaker.

The present invention consists in the pneumatic tires reinforced with a carcass and a breaker and comprising a tread portion, a pair of side portions extending to both the shoulders of the tread portion and a pair of bead portions formed on each inner periphery of the side portions, characterized in that said carcass is composed of polyester fiber or 6,6-nylon fiber cord layer and said breaker is composed of a layer wherein aromatic polyamide fiber cords having a tenacity of more than 10 g/d, an initial modulus of more than 150 g/d, and a twisting coefficient of cable twist of 0.10 – 0.60 and that of ply twist of 100 – 200 percent based on the cable twist, said twisting coefficient being represented by the following formula, $$NT = N \times \sqrt{0.139 \times D/\rho} \times 10^{-3}$$

wherein NT represents the twisting coefficient, N is a twist number per 10 cm, D is 1/2 of total denier of cord and $\rho$ is specific gravity of fiber, are embedded in parallel in a rubber having 300 percent modulus of 130 – 250 Kg/cm², and arranged in an angle of 5° – 38° against the circumferential direction.

The aromatic polyamide fiber cords to be used in the present invention are those represented by the general formulae having amide linkage and aromatic group in the molecule,

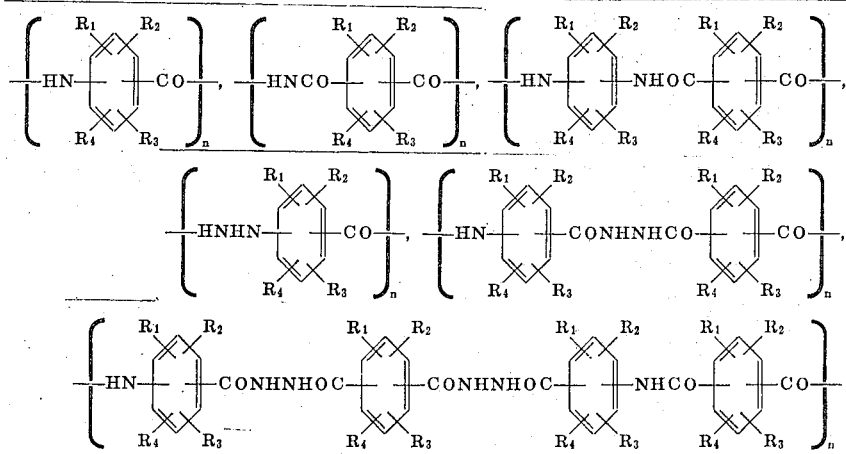

wherein $R_1$, $R_2$, $R_3$ and $R_4$ are hydrogen, halogen and hydrocarbon residual.

The aromatic polyamide fiber cords to be used in the present invention have a tenacity of more than 10 g/d, preferably more than 15 g/d and an initial modulus of more than 150 g/d, preferably more than 200 g/d.

When a plurality of aromatic polyamide filaments are twisted to form a cord, if the twisting coefficient is too low, the sizing property of the cord is considerably poor and the penetration of adhesive is not uniform and the cord is apt to be separated from rubber during the running of tire and the fatigue resistance of the cord is noticeably decreased. While, when the twisting coefficient is too high, the tenacity and the modulus are considerably decreased.

The twisting coefficient of the cord to be used in the present invention is represented by the following formula $$NT = N \times \sqrt{0.139 \times D/\rho} \times 10^{-3}$$

wherein NT is a twisting coefficient, N is a number of twist per 10 cm cord, D is one-half of a total denier of the cord and $\rho$ is a specific gravity of the fiber and the twisting coefficient of the cable twist is 0.10 – 0.60 and the ply twist is 100 – 200 percent of the cable twist and the twisting coefficient of the cable twist is preferred to be 0.25 – 0.45.

When a conventional rubber embedding aromatic polyamide fiber cords is used for a breaker wherein the aromatic polyamide fiber cords are arranged in an angle of 5° – 38° against the circumferential direction of the tire, the tensile modulus is satisfactorily high but the bending rigidity is low and the satisfactory tire performance can not be obtained. Accordingly, a rubber having a higher modulus than that of the rubber used in the usual synthetic fiber cords is required and has 300 percent modulus after vulcanization of 130 – 250 Kg/cm², preferably 160 – 250 Kg/cm².

According to the present invention, it has been found that the use of the particularly defined cord layers as mentioned above for the carcass and breaker in the radial tires or bias belt tires provides pneumatic tires having improved tire performances, particularly, tread wear resistance, cornering performance, ride feeling, high speed performance and fatigue resistance.

The following examples are given for the purpose of illustration of this invention and are not intended as limitations thereof.

EXAMPLE 1

As the aromatic polyamide fiber cords to be used in the pneumatic tires of the present invention, polyparaphenylene terephthalamide fiber was used for a breaker and radial tires were prepared as follows and the tread wear resistance, cornering performance, ride feeling and high speed performance were determined.

Cord (a):
tenacity: 13 g/d
initial modulus: 170 g/d
twisting coefficient of cable twist: 0.55
twisting coefficient of ply twist: 0.55
1,600 d/2
Cord (b):
tenacity: 18 g/d
initial modulus: 400 g/d
twisting coefficient of cable twist: 0.38
twisting coefficient of ply twist: 0.38
1,600 d/2
Tire size:
175-14, 2 ply layers,
2 breaker layers
Angle of carcass cords:
perpendicular to the circumferential direction of tire Angle of breaker cords:
15° against the circumferential direction of tire 1) Test tires
Tire A (Present invention):
As the breaker, a layer embedding the cord (a) in a rubber having 300 percent modulus of 150 Kg/cm² was used and as the carcass, polyester fiber cord layer of 1,300 d/2 was used.
Tire B (Present invention):
As the breaker, a layer embedding the cord (b) in a rubber having 300 percent modulus of 180 Kg/cm² was used and as the carcass, polyester fiber cord of 1,300 d/2 was used.
Tire C (Comparative):
As the breaker, a layer embedding the cord (a) in a rubber having 300 percent modulus of 115 Kg/cm² was used and as the carcass, polyester fiber cord of 1,300 d/2 was used.
Tire D (Comparative):
As the breaker, a layer embedding the cord (a) in a rubber having 300 percent modulus of 150 Kg/cm² was used and as the carcass, 6-nylon fiber cord of 1,050 d/2 was used.
Tire E (Conventional):
As the breaker, steel cord layer of 1×5 (diameter of the steel: 0.25 mm) was used and as the carcass, polyester fiber cord layer of 1,300 d/2 was used.
Tire F (Conventional):
As the breaker, EHM rayon cord layer of 1,650 d/2 was used and as the carcass, 6,6-nylon fiber cord layer of 1,050 d/2 was used.

2) Test method
Tread wear resistance:
A road test was effected under the following condition:
Load per 1 tire: about 400 Kg
Internal pressure of tire: 2.0 Kg/cm²
Average speed: about 40 Km/hr
Road: Good city road
After 40,000 Km running, the tread wear was measured.
Cornering performance:
The cornering performance of tire is represented by the cornering force. When a slip angle is given to a tire, the car naturally begins to turn and a centrifugal force is produced by the turning movement. The cornering force is a force which is caused by a frictional force between the tire and the road surface against the centrifugal force in a direction perpendicular to the rotating plane of the tire. The cornering force is measured by means of a drum tester.
The higher cornering force means the better cornering performance.
High speed performance:
The high speed performance is measured by running a car on a drum tester under a given load for a given time and then the speed is increased step by step and the speed and time when the tire is broken, are measured.
Ride feeling:
The feeling test is made by a test driver.

3) Test results
The test results are shown in the following Table 1. The tread wear resistance, cornering performance and high speed performance are shown by the index based on the measured values of the tire F (Conventional) of 100. The larger index means the better property.

Table 1

| Test tire | A | B | C | D | E | F |
|---|---|---|---|---|---|---|
| Test results | Present invention | Present invention | Comparative | Comparative | Conventional | Conventional |
| Tread wear resistance | 145 | 150 | 125 | 120 | 155 | 100 |
| Cornering performance | 140 | 145 | 120 | 120 | 145 | 100 |
| Ride feeling | Good | Good | Good | Good | Bad | Good |
| High speed performance | 120 | 125 | 110 | 105 | 95 | 100 |

The tires of the present invention have less drawbacks than the conventional tires and are synthetically excellent and particularly the high speed performance is better.

EXAMPLE 2

The aromatic fiber cords used in Example 1 were used for the breaker and the bias belt tires were produced in the following manner and the same test as in Example 1 was made.

Tire size:
C78-14, 2 ply layers,
2 breaker layers
Angle of carcass cord:
32° against the cross sectional direction of tire
Angle of breaker cord:
28° against the circumferential direction of tire Tire G (Present invention):

As the breaker, a layer embedding the cord (a) in a rubber of 300 percent modulus of 180 Kg/cm² was used and as the carcass, 6,6-nylon fiber cord layer of 1,260 d/2 was used.

Tire H (Conventional):

As the breaker, glass fiber cord layer of E.C.G. 75-5/0 was used and as the carcass, 6,6-nylon fiber cord of 1,260 d/2 was used.

The test results are shown in the following Table 2.

Table 2

| Test tire | G | H |
|---|---|---|
| Test results | Present invention | Conventional |
| Tread wear resistance | 135 | 100 |
| Cornering performance | 150 | 100 |
| Ride feeling | Good | Good |
| High speed performance | 140 | 100 |

From the above data it can be seen that the tire of the present invention is synthetically superior to the conventional tire.

What is claimed is:

1. Pneumatic tires reinforced with a carcass and a breaker and comprising a tread portion, a pair of side portions extending to both the shoulders of the tread portion and a pair of bead portions formed on each inner periphery of the side portions, characterized in that said carcass is composed of polyester fiber or 6,6-nylon fiber cord layer and said breaker is composed of a layer wherein aromatic polyamide fiber cords having a tenacity of more than 10 g/d, an initial modulus of more than 150 g/d, and a twisting coefficient of cable twist of 0.10 – 0.60 and that of ply twist of 100 – 200 percent based on the cable twist, said twisting coefficient being represented by the following formula $$NT = N \times \sqrt{0.139 \times D/\rho} \times 10^{-3}$$

wherein NT represents the twisting coefficient, N is a twist number per 10 cm, D is one-half of total denier of cord and $\rho$ is specific gravity of fiber, are embedded in parallel in a rubber having 300 percent modulus of 130 – 250 Kg/cm² and arranged in an angle of 5° – 38° against the circumferential direction.

2. The pneumatic tires as claimed in claim 1, wherein said aromatic polyamide fiber cords has a tenacity of more than 15 g/d, an initial modulus of more than 200 g/d and a twisting coefficient of the cable twist of 0.25 – 0.45.

3. The pneumatic tires as claimed in claim 1, wherein the rubber to embed the aromatic polyamide fiber cords has 300 percent modulus of 160 – 250 Kg/cm².

* * * * *